H. BERNAY.
DRILL.
APPLICATION FILED MAY 31, 1919.

1,375,997.

Patented Apr. 26, 1921.

Inventor:
Henri Bernay
By Arthur L. Slee
ATTY.

UNITED STATES PATENT OFFICE.

HENRI BERNAY, OF SAN FRANCISCO, CALIFORNIA, ASSIGNOR, BY MESNE ASSIGNMENTS, TO FRED W. THURSTON, OF SAN FRANCISCO, CALIFORNIA.

DRILL.

1,375,997.        Specification of Letters Patent.     Patented Apr. 26, 1921.

Application filed May 31, 1919. Serial No. 301,347.

*To all whom it may concern:*

Be it known that I, HENRI BERNAY, a citizen of the United States, residing in the city and county of San Francisco and State of California, have invented a certain new and useful Improvement in Drills, of which the following is a specification.

My invention relates to improvements in means for detachably connecting bits to drill chucks wherein a portion of the bar operates in conjunction with the chuck for detachably engaging a shank of a bit to prevent lateral movement of said bit within a transverse slot within the chuck.

The primary object of the present invention is to provide improved means for detachably connecting a bit to a chuck in such a manner that said bit may be easily and readily removed.

A further object of the invention is to provide improved means of the character described that shall be simple and effective in operation and of a maximum efficiency.

A still further object of the present invention is to provide a holding means for drill bits which shall not be affected by the rapid vibrations and shock of impact during the drilling process.

It is also an object to provide a holding device as set forth adapted to facilitate the passage of water or air directly onto the bit thereby effectively providing a cooling and clearing means for said bit.

Another object of the invention is to provide means for locking the bit in the chuck simultaneously with the securing of the chuck to the drill bar, and for removing the bit from the chuck by loosening the chuck on, or removing the chuck from the drill bar.

I accomplish these several objects by means of the improved device disclosed in the drawings forming a part of the present specification wherein like characters of reference are used to designate similar parts throughout the said specification and drawings, and in which.

Figure 1:
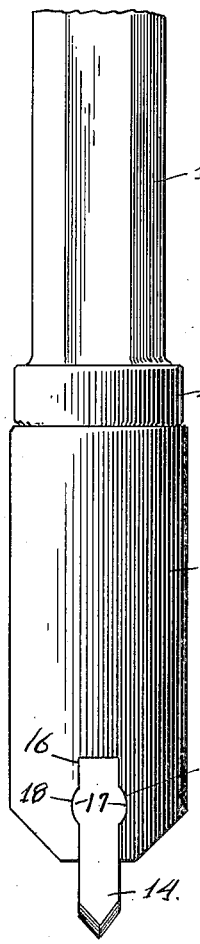
Figure 1 is a side elevation of a bar, chuck and drill.
Figure 3:
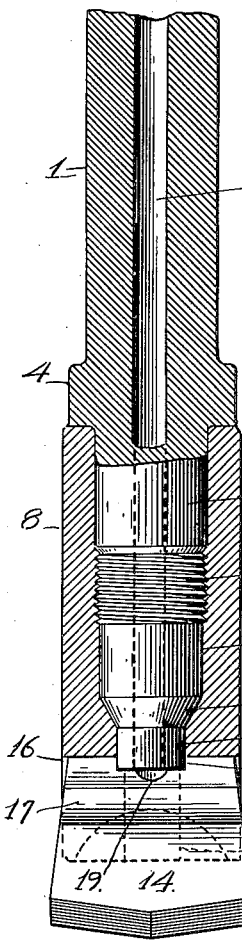
Fig. 3 is a broken vertical sectional view disclosing the manner in which the holding means engages the shank of the bit.
Figure 4:
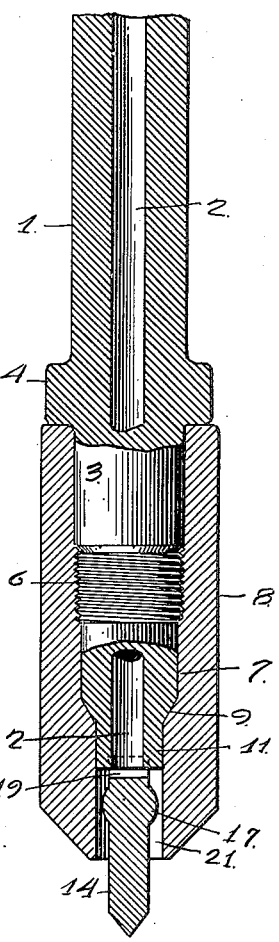
Fig. 4 is a broken vertical sectional view taken at right angles to Fig. 3 and disclosing the water passage through the drill.
Figure 2:
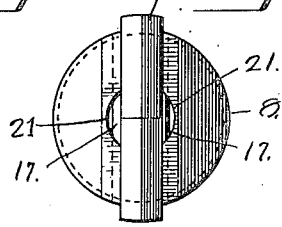
Fig. 2 is a bottom plan view of Fig. 1.

Referring to the drawings the numeral 1 is used to designate a drill bar or stock having a central longitudinal passage 2 therethrough and a reduced portion 3 extending beyond a collar 4 on the bar 1. The reduced portion 3 is provided with a threaded portion 6, to engage a female thread within the bore 7 of a chuck 8, and a frusto conical portion 9 terminating in a cylindrical extension 11 which projects into a substantially rectangular recess 12 on the inner end or shank of a bit 14 slidable laterally within a transverse slot 16 of the chuck 8 but held against longitudinal movement relatively to the chuck 8 by means of convexed ribs 17 on the faces or sides of the bit 14 which ribs slidably engage concaved grooves 18 in the sides or faces of the slot 16.

The recess 12 in the bit 14 is provided with an arcuate extension 19 which registers with the bore 2 which bore extends through the bar 1 to the extension 11 to permit the passage of water or air from said bore 2 through said extension 19, to a bore 21 within the end of the chuck which transversely intercepts the slot 16 in the chuck 8.

In operation the bit 14 is easily removed by the simple expedient of unscrewing the chuck 8 which action will move the bit 14 longitudinally relatively to the extension 11 and thereby cause said extension to rotate in and to be receded from the recess 12.

As soon as the extension 11 is disengaged from the recess 12 the bit 14 may be moved transversely to the chuck in the slot 16 and thereby easily removed. In replacing a bit the above described operation is reversed.

Figure 5:
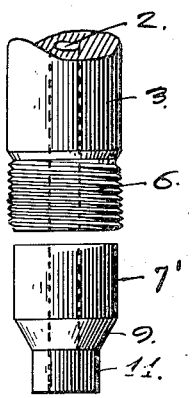
Fig. 5 is a broken detailed view of a modified form of the invention.

As steel bars for drilling purposes are expensive and must be of a high grade of steel I have provided the modified form of the invention disclosed in Fig. 5 of the drawings wherein the extension 7' is formed of a piece separate from the reduced portion 3 of the bar 1. By means of this arrangement the bar 1 may consist of an inferior grade of steel, sufficiently efficient for transmitting the power to the bit, but not necessarily of a high grade of carbon steel such as is required for bits, while the separate extension 7' may be of a high grade of steel suitable for exposure to the rapid vibrations and shocks occasioned by the drilling process.

The bore 21 within which is fitted the extension 14, is of a slightly larger diameter than the diameter of the combined convexed ribs 17 passing therethrough. This arrangement is provided to readily permit the passage of water through the center of the bar 1 and chuck 8 and thereby pass water directly to said bit to prevent overheating of the same thereby facilitating the operation of the drill and also conforming to the legal statutes in some States which require the use of streams of water with drilling operations underground.

By means of this novel arrangement sand and bits of broken rock are also prevented from lodging and packing within the central bore by the current of water passing through the central bore 2 of the bar 1 and extension 14.

When the chuck 8 is screwed up against the collar 4 on the bar 1 the extension 14 of the said bar 1, or reduced portion 3 thereof, rigidly engages the end or shank of the bit 14 and prevents movement thereof which might remove the bit from the chuck.

It is obvious from the foregoing that I have provided an improved holding means for detachable bits adapted to easily release said bit when required.

It is also evident that I have provided an improved device of the character described wherein an unobstructed flow of water through the center of the drill and directly to the bit may be obtained, thereby preventing the packing of sand and broken rock within the drill and preventing overheating of the bit by the steady and uninterrupted flow of water or air, as the case may be.

Having thus described my invention, what I claim as new and desire to secure by Letters Patent is:

1. In a drill, the combination of a longitudinally bored drill bar having a screw threaded portion and a bit-locking extension; a longitudinally bored chuck in which fit said portions of the drill bar, the chuck having a screw thread engaging on that of said drill bar, and being formed with a central bore open at its lower end and with a transverse slot intersecting the bore of the chuck; and a bit arranged across said bore so as not to close the same, and laterally slidable in said slot, said bit and slot having means for holding the bit from movement longitudinally of the drill bar, the bit having also a recess in its upper edge with which the extension of the drill bar has a locking engagement, the extension entering said recess and binding or releasing the bit by the operation of said screw threads.

2. In a drill, the combination of a longitudinally bored drill bar having a fixed collar thereon near its lower end and below said collar a reduced portion, a screw-threaded portion, and a bit-locking extension; a longitudinally bored chuck in which fit said portions of the drill bar, the chuck bearing against said collar and having a screw thread engaging on that of said drill bar, and being formed with a central bore open at its lower end and with a transverse slot intersecting the bore of the chuck; and a bit arranged across said bore so as not to close the same, and laterally slidable in said slot, said bit and slot having means for holding the bit from movement longitudinally of the drill bar, the bit having also a recess in its upper edge with which the extension of the drill bar has a locking engagement, the extension entering said recess and binding or releasing the bit by the operation of said screw threads.

3. In a drill, the combination of a longitudinally bored drill bar having a fixed collar thereon near its lower end and below said collar a reduced portion, a screw threaded portion, a conical portion and a bit-locking extension; a longitudinally bored chuck in which fit said portions of the drill bar, the chuck bearing against said collar and having a screw thread engaging on that of said drill bar, and being formed with a central bore open at its lower end and with a transverse slot intersecting the bore of the chuck and having grooves in its sides; and a bit arranged across said bore so as not to close the same, and having ribs fitting said grooves, and laterally slidable in said slot, the bit having also a recess in its upper edge with which the extension of the drill bar has a locking engagement, the extension entering said recess and binding or releasing the bit by the operation of said screw threads.

In witness whereof I hereunto set my signature.

HENRI BERNAY.